United States Patent [19]

Saliba

[11] Patent Number: 5,289,328
[45] Date of Patent: Feb. 22, 1994

[54] METHOD AND APPARATUS FOR VARIABLE DENSITY READ-AFTER-WRITING ON MAGNETIC TAPE

[76] Inventor: George Saliba, 109 Howard St., Northboro, Mass. 01532

[21] Appl. No.: 888,941

[22] Filed: May 26, 1992

[51] Int. Cl.$^5$ .............................................. G11B 5/29
[52] U.S. Cl. ................................... 360/121; 360/104
[58] Field of Search ................................ 360/121, 104

[56] References Cited

U.S. PATENT DOCUMENTS

| | | | |
|---|---|---|---|
| 4,298,897 | 11/1981 | Arter et al. | 360/39 |
| 4,539,615 | 9/1985 | Arai et al. | 360/121 |
| 4,553,177 | 11/1985 | Scholich | 360/121 |
| 4,685,005 | 8/1987 | Fields, Jr. | 360/53 |
| 4,819,107 | 4/1989 | Bolt | 360/121 |
| 4,954,921 | 9/1990 | Bolt | 360/121 |
| 5,008,765 | 4/1991 | Youngquist | 360/121 |
| 5,012,375 | 4/1991 | Nishimura | 360/119 |
| 5,027,245 | 6/1991 | Nagata et al. | 360/121 |
| 5,047,873 | 9/1991 | Ballinger et al. | 360/22 |
| 5,068,760 | 11/1991 | Kira | 360/121 |
| 5,132,861 | 7/1992 | Behr | 360/121 |
| 5,218,498 | 6/1993 | Jagielinski | 360/121 |

OTHER PUBLICATIONS

Arter et al, "Recording Narrow Tracks", IBM Tech Disc Bull, vol. 21, No. 12, May 1979, p. 4780.

Primary Examiner—Robert S. Tupper
Attorney, Agent, or Firm—Albert P. Cefalo; Ronald C. Hudgens; Stephen Y. Chow

[57] ABSTRACT

A magnetic tape read/write head for variable track density forward and backward writing and checking after writing, incorporating a read gap and two larger write gaps arranged off center from the read gap on the axis of tape motion. Each pass of one of two write gaps writes a data band of the width of the write gap. A second pass in the same direction overwrites to some extent the previously written data band so as to define the width of the data track.

8 Claims, 4 Drawing Sheets

METHOD AND APPARATUS FOR VARIABLE DENSITY READ-AFTER-WRITING ON MAGNETIC TAPE

FIELD OF THE INVENTION

This invention is related generally to the field of magnetic tape storage technology. The invention involves a method and apparatus for writing on magnetic tape with immediate read-after-write at variable data track densities that are "backwardly compatible" with magnetic tape storage apparatus of lesser track densities.

BACKGROUND OF THE INVENTION

In contemporary computer systems, magnetic tape storage is used primarily for mass storage of data, usually for archival purposes. For those purposes, random access is not required on a frequent basis. Thus, typically, a steady stream of data is recorded sequentially on the tape medium.

As the density of data storage on magnetic tape has been increased both by increasing the number of data tracks written on a given size of tape (track density) and by increasing the amount of data placed on each track, checking of the data written has become important. Adapted for such checking is a configuration of the read/write transducer or head having a "core" or "gap" for writing followed immediately (from the point of view of the data written on the tape) with a read gap to check data as it is written. The read gap typically is narrower than the write gap in such a situation so as to avoid reading adjacent tracks which are in close proximity in high density recording and which might otherwise be read if there is lateral tape motion.

Currently, the read and write cores are among the most expensive components of a magnetic tape device. Thus, tape drives for recording on multiple longitudinal data tracks, typically 50–500 tracks, do not employ 50–500 cores, one for each track. Instead, such multiple track tape drives may employ only one or two write cores to record, respectively, one or two tracks at a time as the tape moves in one direction. When the end of the tape is reached, the direction of tape motion is reversed, the tape head assembly is shifted transverse to the direction of tape motion, and another one or two tracks are written. This reversal and shifting is repeated until recording is completed or the tape is filled. The additional time required relative to fewer sweeps of a head assembly with more write cores generally is tolerable for archival applications.

As mentioned above, newer tape drives have achieved increasingly higher data densities by increasing track density using more and narrower tracks, for example, up to 500 tracks on ½-inch magnetic tape. These newer drives utilize narrow read gaps that can read the wider tracks written by older tape drives and thus allow for so-called "forward compatibility." However, there is also need for "backward compatibility," in which the newer drives can record for reading by older tape drives with wider read gaps.

SUMMARY OF THE INVENTION

The invention provides a method and apparatus for writing on magnetic tape with immediate read-after-write at variable densities that is backwardly compatible with tape drives that read data tracks wider than the minimum track width used in an implementation of the invention. This is accomplished in the illustrative embodiment by a read/write head for forward and backward writing and checking after writing that incorporates a central read gap and two wider write gaps on opposite sides (upstream and downstream) of the read gap relative to the longitudinal direction of tape motion.

The two write gaps are used alternately, one for forward and one for reverse writing on the tape. As the tape moves in one direction, the upstream write gap writes data on the tape in a "write band" substantially equal in width to the transverse extent of the write gap. The write band is read by the read gap in a much narrower "read band" substantially equal in width to the transverse extent of the read gap. As will be clear from the subsequent description, the width of the read band is the narrowest data track width allowed in the illustrative embodiment, while the wider write band allows a wider data track for backward compatibility for tape drives with wider read gaps.

In each of the two write-read gap pairs (the read gap is common to both), the write gap extends a much greater transverse distance beyond one end of the much narrower read gap than it extends beyond the other end. At the other end, the write gap extends only slightly to allow for an inter-track guard band, explained further below. The write gap for "forward" writing extends substantially beyond the extent of the common read gap in one transverse direction, while the write gap for reverse writing extends substantially beyond the extent of the common read gap in the opposite transverse direction.

The asymmetric arrangement of each write-read gap pair causes the head to write a relatively wide write band which is read by the same head only along a much narrower read band, which is included within the write band, but substantially flush against one side of the write band.

After a write band is written by a given write-read gap pair, on the next pass (after the tape has reversed its direction of motion twice), the transverse position of the write-read gap pair relative to the tape may be adjusted so that a portion of the previously written write band is overwritten. According to the invention, the wider portion of the prior write band that the prior read band did not overlap is the "trimmable" portion and is overwritten or partially overwritten, depending on the data track width desired for ultimate reading.

If the recording is for backward compatibility with tape drives employing a read gap of a width equal to the full width of the write band, the transverse position is adjusted so that there is no overwriting. For reading by a read gap of a width equal to the read band, the transverse position is adjusted so that, except for some allowance for an inter-track guard band as explained below, all of the write band is overwritten that is not included in the read band. For reading by a read gap of intermediate width, the trimmable portion of the write band is partially overwritten. The remainder of the write band after the subsequent pass of the write-read gap pair becomes the data track plus allowances for inter-track guard bands.

For a given direction of tape motion, additional data tracks are added in the transverse direction of the trimmable portion of a write band, so that that trimmable portion of data may be overwritten, always leaving intact the portion of the data previously read by the read gap. As explained further below, because the transverse directions of the write gap extensions are opposite as between the write gaps for writing for a given longitudinal direction of tape motion, the path of the head relative to the tape alternates in vertical movement at the end of writing in one tape direction, thereby tracing an elongated rectangular spiral.

BRIEF DESCRIPTION OF THE DRAWINGS

In order that the invention may be more clearly understood, reference is made to the accompanying drawings which show an illustrative embodiment and details of its operation.

DETAILED DESCRIPTION OF AN ILLUSTRATIVE EMBODIMENT

Figure 1:
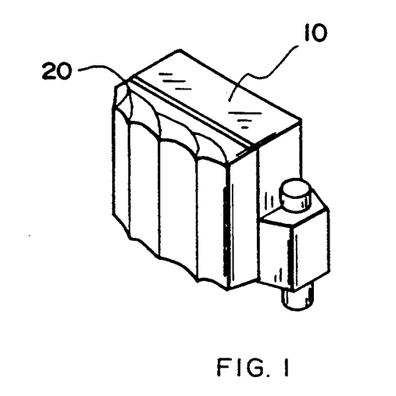
FIG. 1 shows a typical magnetic tape head assembly.
Figure 2:
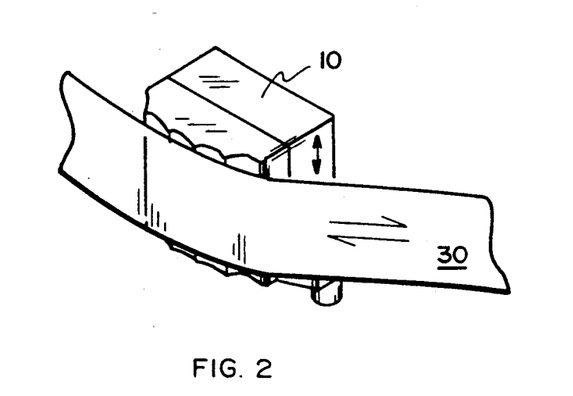
FIG. 2 shows a typical magnetic tape head assembly with magnetic tape.

FIG. 1 shows a typical magnetic tape transducer or head 10, with ridges or "islands" 20 on which magnetic read/write gaps are situated. FIG. 2 shows the same head with magnetic tape 30, with arrows showing the reversible directions of motion of the tape 30, as well as the transverse positioning of the tape head 10. Thus, the tape 30 may move in a forward or backward direction, and the head 10 may be positioned upward or downward to align read or write gaps respectively to read or write data along different data tracks arranged longitudinally on the tape (not shown).

Figure 3:
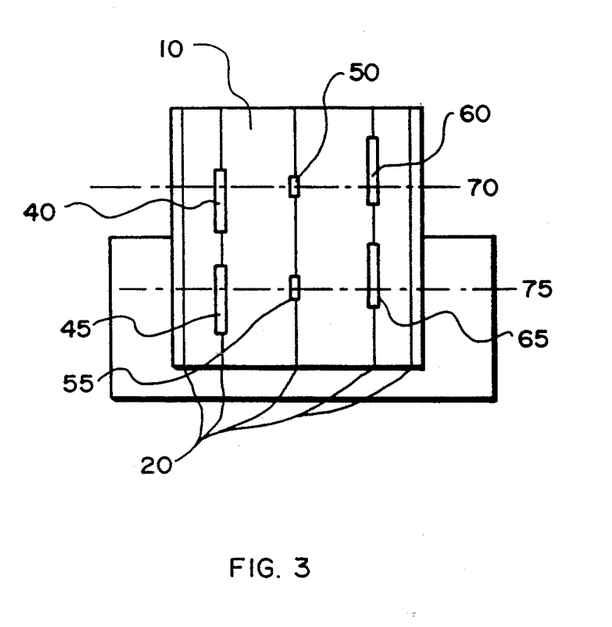
FIG. 3 shows one embodiment of the invention with two write-read-write gap sets.

FIG. 3 is a plan view (not to scale) of a head 10 that embodies the invention implemented with two sets of write-read-write gaps (write gap 40, read gap 50, and write gap 60; and write gap 45, read gap 55, and write gap 65). Each gap in a set is shown much larger than scale and is arranged on one of centerlines 70 or 75, which respectively pass through the centers of read gaps 50 and 55 parallel to the reversible directions of longitudinal tape motion. The invention may also be implemented with only one set of write-read-write gaps or with three or more sets of write-read-write gaps.

Figure 4:
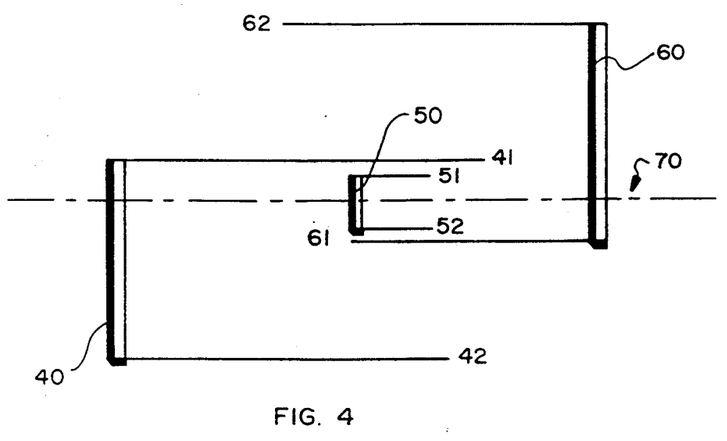
FIG. 4 shows a detail of the placement of magnetic gaps used in one write-read-write gap set.

Shown approximately to scale in FIG. 4 are further details of the arrangement of the set of write-read-write gaps arranged on centerline 70. Write gap 60 is used for writing data when the relative tape motion is from the right; write gap 40 is used for writing data when the tape motion is reversed, that is, the relative tape motion is from the left. In both cases of relative tape motion, read gap 50 is used to read the data (for checking purposes) substantially immediately after it is written, that is, as the tape moves the distance between the write gap 40 or write gap 60, as the case may be, and read gap 50. In other implementations, that distance (and correspondingly, time) may be less than the scale shown, down to zero.

The transverse extents of the widths of the write gaps 40 and 60 are represented respectively by the distance between lines 41 and 42 and lines 61 and 62. These write gap widths are shown to be considerably greater than, and may be multiples of (for example, four times) the width of the read gap 50, represented by the distance between lines 51 and 52 (for example, approximately 2 mils). As explained in further detail below, this allows for a corresponding range of backward compatibility relative to track densities. In the illustrative embodiment, the widths of the write gaps 40 and 60 are equal, although they need not be equal.

Write gap 40 extends substantially farther (for example, by a multiple of ten) beyond the extent of read gap 50 towards line 42 than towards line 41. Similarly, write gap 60 extends substantially farther beyond the extent of read gap 50 towards line 62 than towards line 61. On the scale shown, the line 41 (top) end of write gap 40 may be considered substantially flush with the line 51 (top) end of read gap 50, and the line 61 (bottom) end of write gap 60 may be considered substantially flush with the line 52 (bottom) end of read gap 50.

As shown in FIG. 4, the gap ends are not precisely flush along their longitudinal projections, that is, line 41 is not coincident with line 52, and line 61 is not coincident with line 52. Instead, read gap 50, being of a width represented by the distance between lines 51 and 52, is somewhat less in width than the distance between lines 41 and 61. The choice to make the read gap 50 narrower owes to and is quantified by well-known principles of "write-wide-read-narrow," for example, to avoid reading data on adjacent data tracks, particularly when the tape may wobble or slip in the direction transverse to the direction of motion. Thus, the distance between line 41 and line 51 provides a margin of error both for checking data being written by write gap 40 and for subsequent reading using a read gap of the width of read gap 50. Similarly, the distance between lines 61 and 52 provides a margin of error for reading data written by write gap 60. These margins, plus additional margins explained further below, provide "guard bands" between data tracks.

The distances between lines 41 and 51 and between lines 61 and 52, are the margins that the read gap 50 is set back from the longitudinal projections of "substantially flush" ends of the write gaps. In the illustrative embodiment, these margins are equal to each other (they need not be) and are chosen each to be one-half the width of a desired inter-track guard band. Such guard bands typically may be one mil in width.

Figure 5:
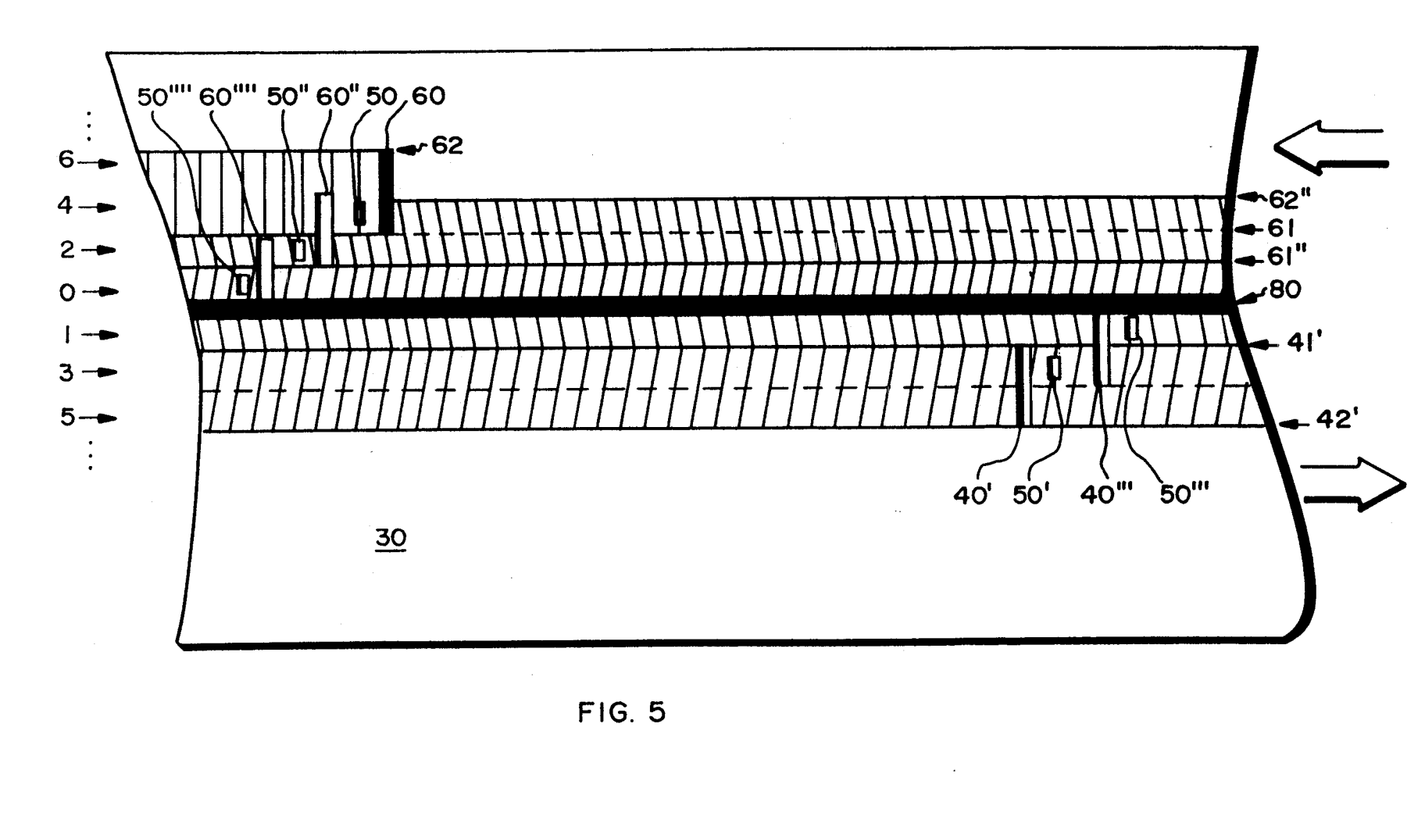
FIG. 5 shows a detail of how data is written on magnetic tape by one write-read-write gap set.
Figure 6:
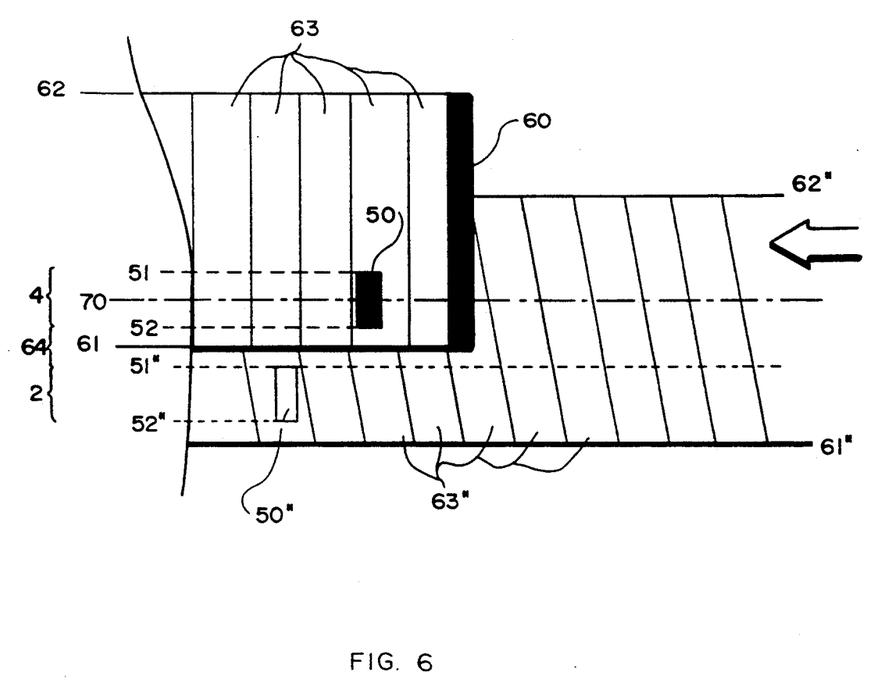
FIG. 6 shows a further detail of how data is written on the magnetic tape by one write-read gap pair.
Figure 7:
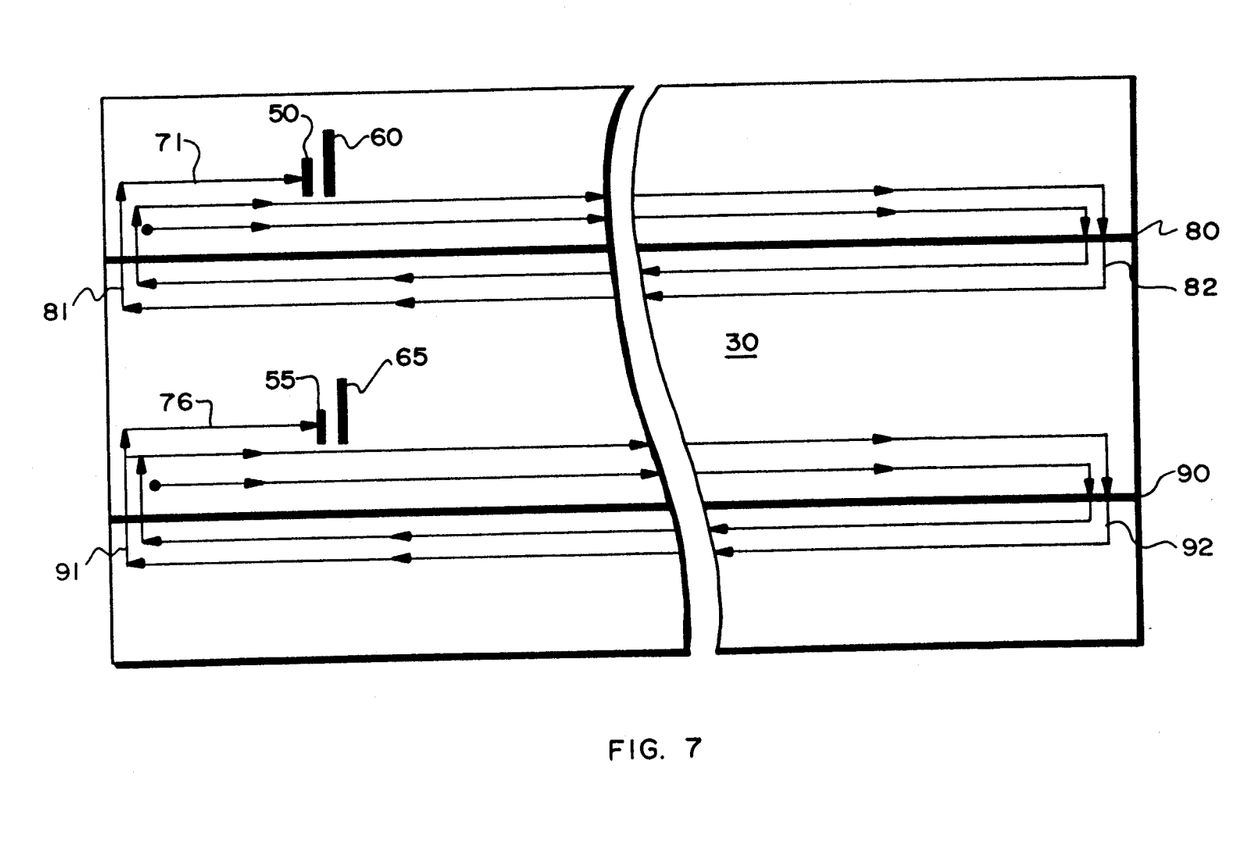
FIG. 7 shows an elongated rectangular spiral pattern of gap motion relative to the magnetic tape for the illustrative embodiment of two write-read-write gap sets.

FIGS. 5, 6, and 7 detail the use of the write-read-write gap arrangement of the invention for writing data on a magnetic tape, where FIG. 5 shows a detail of the data structure associated with one set of write-read-write gaps 40, 50 and 60, and FIG. 6 shows a further detail of data being written by write-read gap pair 60 and 50. FIG. 7 shows the paths 71 and 76, relative to the tape 30, of write-read-write gaps 40, 50, and 60; and 45, 55, and 65, respectively.

As shown in FIG. 7, the paths 71 and 76 alternate in longitudinal direction in unison over the length of the tape 30 on each side of guard bands 80 and 90 respectively and progress farther from those guard bands in outward, elongated rectangular spirals. Not shown in FIG. 7 is the fact that, at the ends 81, 82, 91, and 92, each of paths 71 and 76 may cross or overlap itself, depending on when and how tape reversal and transverse movement of the head assembly relative to the tape is accomplished.

Referring to FIG. 5, data tracks are numbered to the left, even numbers from 0 to 6 referring to tracks written or to be written on the forward motion of the tape, shown by the arrow on the right as tape motion from the right. Odd numbers from 1 to 5 refer to tracks written or to be written on the reverse motion of the tape, shown by the arrow on the right as tape motion from the left. Center guard band 80 (distinguished from the inter-track guard bands) separates the forward tracks from the reverse tracks.

Still referring to FIG. 5, the write gap 60 and the read gap 50 is shown in solid in their present position on track 4 extending through track 6 relative to the tape 30. (This is not to scale, since, in the illustrative embodiment, the write gap 60 is more than twice the width of read gap 50, and thus would straddle more than two data tracks of the width of read gap 50.) Prior positions of the write-read-write gap set are shown in outline as 50" and 60" on track 2 and as 50"" and 60"" on track 0 on the forward passes or legs of tape motion and shown as 40' and 50' on track 3 and as 40'" and 50'" on track 1 on the reverse legs.

FIG. 6 shows further detail of the write-read gap pair 60 and 50 in their present position. Write gap 60 has written data 63 in a write band bounded by lines 61 and 62. Read gap 50 reads data 63 along a narrow read band bounded by lines 51 and 52. Write gap 60 is overwriting a portion of a prior write band bounded by lines 61" and 62" including data 63", the overwritten portion being bounded by lines 62" and 61 and obscured (overwritten) by data 63.

For purposes of illustration, assume that the data in FIG. 6 is being written for subsequent reading by a read gap with the same width as read gap 50, which is the same as read gap 50". Lines 51" and 52" bound the prior read band of gap 50", including data 63" in a position in which it may be read by a read gap of the width of gap 50" reliably without interference from data on other tracks. Thus, the area bounded by lines 51" and 52" is an ideal area to be read by a read gap of the same width as gap 50", and one would attempt to position a read gap of that width on that area to read data 63". Similarly, lines 51 and 52 bound the ideal area in which to read data 63. These areas are therefore viewed as the data tracks, and lines 51" and 52" and lines 51 and 52 thus respectively define tracks 2 and 4.

The areas of the tape on which data has been written, but not part of a data track are the inter-track guard bands. One such guard band is shown in FIG. 6 as the region 64 between lines 52 and 51". As previously explained, in the illustrative embodiment, one-half of the typically 1 mil width of the inter-track guard band is provided by the distance between lines 52 and 61, the projections of "substantially flush" ends of read gap 50 and write gap 60, respectively. That portion of the guard band between lines 52 and 61 include a portion of data 63. The other half of the guard band, the area between lines 61 and 51" in FIG. 6, is provided by the positioning of write gap 60 so as to overwrite only so much of the prior write band bounded by lines 62" and 61" (including data 63") so as to leave the portion between lines 61 and 61". The portion between lines 61 and 51" then becomes part of guard band 64, the portion between lines 51" and 52" becomes track 2, and the portion between lines 52" and 61" becomes part of the guard band between tracks 2 and 0 (not shown). The inter-track guard bands are not shown in FIG. 5, but are included within the tracks 0 through 6.

Where backward compatibility with a device with lesser track density is desired, it is intended that the data 63 and 63" be read by a device with a read transducer wider in its read span than read gap 50. FIG. 6 may still be employed to visualize the writing of data for such compatibility. In such a case, the width of the intended read transducer would simply be substituted for those of read gap 50", that is, the distance between lines 51" and 52" would be increased to the width of the intended read transducer. With the inter-track guard bands bounded by lines 61 and 51" and lines 52" and 61" maintained, the increase of the distance between lines 51" and 52" would require a decrease in the distance between lines 62" and 61. In other words, the portion of the write band including data 63" would be overwritten to a lesser extent than it would be if the data is to be read by a smaller read transducer.

The guard band allowances shown in FIG. 6 as the sum of the distances between lines 61 and 51" and lines 52" and 61" may also be adjusted according to the characteristics of the reading device. Thus, if the intended read device requires larger inter-track guard bands, for example, because of more tape slippage, those distances may be increased, and the overwritten region between lines 62" and 61 would be further decreased.

In the illustrative embodiment, the width represented by the distance between lines 62" and 61", the width of write gap 60, is several multiples of (for example, four times) the width of read gap 50". Accordingly, the range of adjustment is also across several multiples of the width of read gap 50". In the case in which the width of the intended read transducer is equal to the width of the write band between lines 62" and 61", there would be no overwriting by write gap 60. To allow for inter-track guard bands in that case or to allow for reading by an intended read transducer wider than the width of the write band, write gap 60 may be positioned farther up in FIG. 6 to provide a vertical gap between the write bands (not shown). Thus, in the illustrative embodiment, backward compatibility is provided over multiple track densities.

Referring to FIG. 5, data is first written by write gap 60"" and verified by read gap 50"" on track 0 (the write band is wider and not shown) from left to right on tape 30 (moving from the right). At the right end of tape 30, shown in FIG. 7 as end 82, the entire head assembly 10 is moved downward (or the tape 30 is moved upward) so as to position read gap 40'" and read gap 50'" to write and verify respectively on track 1 (the write band is wider and not shown) from right to left on tape 30 (moving from right to left).

The center, inter-directional, guard band is shown as the solid band 80. However, the center guard band actually includes the partial inter-track guard band allowances provided by the setting back of the read gap 50 from the longitudinal projections of the "substantially flush" ends of write gaps 60 and 40, which respectively are included in the data labeled in FIG. 5 as tracks 0 and 1. The width of guard band 80 is a matter of engineering choice and may simply be the width allowed by the setting back of the ends of the read gap 50, that is, the sum of the distances between lines 41 and 51 and lines 52 and 61 in FIG. 4. This option would be accomplished, after track 0 is written, by moving the head assembly 10 downward relative to the tape 30 a distance between lines 41 and 61 such that the first forward write band containing data written by write gap 60 (shown in FIG. 5 as track 0) is flush over its length with the first backward write band containing data written by write gap 40 (shown in FIG. 5 as track 1). In that case, there would be no solid band 80, but, assuming that the read gap 50 is set back from the "substantially flush" ends of the write gaps 40 and 60 distances each equal to one-half the desired inter-track guard band, there would be the equivalent of an inter-track guard band between tracks 0 and 1 (not shown).

Referring to FIG. 5, after the write band including data in track 1 is written from right to left (that is, the write gap 40''' reaches end 81 in FIG. 7), the head assembly 10 is moved upward relative to tape 30 to a position to allow write gap 60'' to write data in a write band and read gap 50'' to verify data in a read band including track 2 as tape 30 moves from right to left in the second forward leg. The previously written write band including track 0 is partially overwritten according to the desired width of the data track as set forth above with reference to tracks 2 and 4 in FIG. 6. FIG. 5 shows a scenario in which the head assembly 10 is moved upward so that the bottom end of write gap 60'' is substantially flush with the tape path of read gap 50'''', with an allowance for an inter-track guard band.

After the write gap 60'' reaches the right end of the tape (end 82 in FIG. 7), the head assembly 10 is moved downward relative to tape 30 to a position to allow write gap 40' to write data in a write band and a read gap 50' to verify data in a read band including track 3 as tape 30 moves from left to right in the second reverse leg. The previously written write band including track 1 is partially overwritten according to the desired width of the data track using similar considerations set forth above with reference to tracks 2 and 4 in FIG. 6, but with the dimensions and orientation of the write gap 40 substituted for those of write gap 60. Thus, FIG. 5 shows a scenario in which the head assembly 10 is moved downward so that the top end of write gap 40' is substantially flush with the tape path of read gap 50', with an allowance for an inter-track guard band.

When the write gap 40' reaches the left end of the tape (end 81 in FIG. 7), the head assembly 10 is moved upward as previously set forth with reference to tracks 2 and 4 in FIG. 6, and the third forward leg is commenced.

This process is repeated in alternate forward and reverse movement of the tape 30 and in alternate upward and downward (transverse) positioning of the head assembly 10 to increasing distances from the origin on track 0. This results in read gap 50 tracing a path 71 on the tape 30 shown in FIG. 7 as an outward, elongated, rectangular spiral. FIG. 7 further shows the path 76 of the second read gap 55 in the illustrative embodiment as a parallel elongated rectangular spiral, since the two sets of write-read-write gaps of write-read-write gaps 40, 50, and 60; and 45, 55, and 65, are fixed in head assembly 10 and move in unison relative to the tape 30.

As apparent from the above, the extent of overwriting may be increased to fit more tracks (and thus more data) onto a given tape 30, up to a density which is limited by the resulting narrowing of tracks down to the width of the read gap 50 (plus guard bands between adjacent tracks and at the edges). The described gap configuration may also be used to write and check even narrower tracks if the same gap set is not used for subsequent reading: the head is simply positioned to overwrite a previously written write band, including a portion of the prior read band. As for read compatibility, the disclosed gap set may read variable track widths down to a lower bound of the width of the read gap 50.

For backward writing compatibility, the extent of overwriting (and track density) may be decreased to the point at which there is no overlapping of write bands. Assuming that noise problems can be managed, it is possible for a read gap of a given width to read a narrower band of data, and it may be appropriate in some cases to separate successive write bands (in a given tape direction) written by the disclosed gap set so as to achieve even lower track density. The invention thus provides backward write compatibility from track widths of approximately the width of the read gap 50 (and lower, if read compatibility is not required) to somewhat greater than the width of the write gaps 40 and 60. In the illustrative embodiment the range of track density compatibility is greater than a factor of four.

It can be seen that the above-disclosed method and apparatus are applicable to transducers for reading and writing on read and write bands other than magnetic gaps. As discussed above, additional write-read-write transducer sets may be used, resulting in three or more parallel sets of data written in the outward, elongated rectangular spirals exemplified by paths 71 and 76 in FIG. 7.

Using the same write-read-write transducer configuration, it is also possible to arrange for writing data in an inward, rather than outward, elongated rectangular spiral. In that case, rather than commencing the first forward and reverse tracks back-to-back along center guard band 80 as shown in FIGS. 5 and 7, writing would commence at a distance of multiple tracks away from a central longitudinal axis (which may be the center of guard band 80), and spiral toward that center using the same principles for overwriting discussed above for FIG. 6. The difference would be to shift the head assembly upward rather than downward at the end of each forward leg at end 82 in FIG. 7 and downward rather than upward at the end of each reverse leg at end 81, in progressively decreasing transverse shifts.

To practice the invention, the active (writing) write transducer should be upstream (relative to tape motion) of the read transducer. The active write transducer should extend transversely beyond the read transducer in the transverse direction of progressive passes of writing by the write transducer so that a portion of data written by each pass of the write transducer may be overwritten or trimmed on the next pass of the write transducer without affecting the portion previously read by the read transducer. These requirements plus that of alternate forward and reverse writing are met for multiple tracks by moving the disclosed head 10 relative to the tape 30 in either an outward or inward elongated rectangular spiral.

It can also be seen that the same method could be used where a transducer set comprises two read transducers arranged on the upstream and downstream (relative to tape motion) sides of a single write transducer instead of two write transducers arranged upstream and downstream of a single read gap as discussed in detail above. In such a read-write-read arrangement, the upstream read transducer would be disabled during a write operation in a given direction. With future technologies, this arrangement may be reduced to a transducer set in which a single write transducer would incorporate two read transducers at each transverse end of the write transducer (relative to tape motion), the three transducers being coincident relative to longitudinal tape motion.

Having described this invention, what is claimed as new and secured by Letters Patent are:

1. A read/write transducer for writing data in variable width tracks on media comprising:
   A) a read transducer for reading data written on media reversibly moving past said read transducer along a read band of a first width;
   B) a first write transducer positioned upstream of said read transducer for writing data on media moving in a first longitudinal direction past said first write transducer along a first write band of a second width substantially greater than said first width and positioned transversely relative to said first longitudinal media motion such that said first write band will wholly include said read band and the longitudinal edge of said read band, in a first direction transverse to said first longitudinal direction of media motion, is substantially flush against the longitudinal edge of said first write band in said first transverse direction; and
   C) a second write transducer positioned upstream of said read transducer for writing data on media moving in a second longitudinal direction, reverse of said first longitudinal direction, past said second write transducer along a second write band of a third width substantially greater than said first width and positioned transversely relative to said second longitudinal media motion such that the second write band will wholly include said read band and the longitudinal edge of said read band, in a second transverse direction opposite to said first transverse direction, is substantially flush against the longitudinal edge of said second write band in said second transverse direction.

2. The read/write transducer of claim 1 wherein (A) both said second width and said third width are equal to a width at least approximately twice said first width; and (B) the recited substantially flush edges are separated by a distance of one-half the width of an inter-track guard band substantially less than said first width.

3. A read/write head for writing data in variable-width tracks on magnetic media moving relative to said head, said head comprising:
   A) a substantially linear magnetic read gap centrally positioned astride and perpendicular to a centerline parallel to the direction of media motion, said read gap having a first width transverse to said centerline;
   B) a substantially linear first magnetic write gap positioned astride and perpendicular to said centerline upstream from said read gap relative to the direction of media motion, said first write gap having a second width transverse to said centerline substantially greater than said first width and positioned such that said first write gap extends on a first side of said centerline to a distance substantially equal to the distance that said read gap extends on said first side of said centerline; and
   C) a substantially linear second magnetic write gap positioned astride and perpendicular to said centerline downstream from said read gap relative to the direction of media motion, said second write gap having a third width transverse to said centerline substantially greater than said first width and positioned such that said second write gap extends on the a second side of said centerline opposite to said first side to a distance substantially equal to the distance that said read gap extends on said second side of said centerline.

4. The read/write head of claim 3 wherein (A) both said second width and said third width are equal to a width at least approximately twice said first width; (B) said first write gap extends beyond said read gap on said first side of said centerline a distance equal to one-half the width of an inter-track guard band substantially less than said first width; and (C) said second write gap extends beyond said read gap on said second side of said centerline said distance equal to one-half the width of an inter-track guard band.

5. A read/write transducer for writing data in variable width tracks on media comprising:
   A) a write transducer for writing data on media reversibly moving past said write transducer along a write band of a first width;
   B) a first read transducer positioned downstream of said write transducer for reading a portion of a forward write band of said first width written by said write gap on media moving in a first longitudinal direction past said first read transducer along a first read band of a second width substantially less than said first width and positioned transversely relative to said first longitudinal media motion such that said first read band is wholly included within said forward write band and the longitudinal edge of said first read band, in a first direction transverse to said first longitudinal direction of media motion, is substantially flush against the longitudinal edge of said forward write band in said first transverse direction; and
   C) a second read transducer positioned downstream of said write transducer for reading a portion of a reverse write band of said first width written by said write gap on media moving in a second longitudinal direction reverse of said first longitudinal direction past said second read transducer along a second read band of a third width substantially less than said first width and positioned transversely relative to said second longitudinal media motion such that said second read band is wholly included within said reverse write band and the longitudinal edge of said second read band, in a second transverse direction opposite to said first transverse direction, is substantially flush against the longitudinal edge of said write band in said second transverse direction.

6. The read/write transducer of claim 5 wherein (A) both said second width and said third width are equal to a width at most approximately one-half said first width; and (B) the recited substantially flush edges are separated by a distance of one-half the width of an inter-track guard band substantially less than said second width.

7. A read/write head for writing data in variable-width tracks on magnetic media moving relative to said head, said head comprising:
   A) a substantially linear magnetic write gap centrally positioned astride and perpendicular to a centerline parallel to the direction of media motion, said write gap having a first width transverse to said centerline;
   B) a substantially linear first magnetic read gap positioned astride and perpendicular to said centerline downstream from said read gap relative to the direction of media motion, said first read gap having a second width transverse to said centerline substantially less than said first width and positioned such that said first read gap extends on a first side of said centerline to a distance substantially equal to the distance that said write gap extends on said first side of said centerline; and C) a substantially linear second magnetic read gap positioned astride and perpendicular to said centerline upstream from said read gap relative to the direction of media motion, said second read gap having a third width transverse to said centerline substantially greater than said first width and positioned such that said second read gap extends on the a second side of said centerline opposite to said first side to a distance substantially equal to the distance that said write gap extends on said second side of said centerline.

8. The read/write head of claim 7 wherein (A) both said second width and said third width are equal to a width at most approximately one-half said first width; (B) said write gap extends beyond said first read gap on said first side of said centerline a distance equal to one-half the width of an inter-track guard band substantially less than said second width; and (C) said write gap extends beyond said second rear gap on said second side of said centerline said distance equal to one-half the width of an inter-track guard band.

* * * * *